Patented Nov. 5, 1946

2,410,558

UNITED STATES PATENT OFFICE 2,410,558

MANUFACTURE OF CATALYSTS

Glenn M. Webb and Marvin A. Smith, Riverside, Ill., assignors to Universal Oil Products Company, Chicago, Ill., a corporation of Delaware No Drawing. Application March 12, 1943,
Serial No. 478,960

8 Claims. (Cl. 252—250)

The present invention is concerned with improvements in processes for the manufacture of catalysts adapted for use in various processes involving the treatment or conversion of organic substances, and particularly processes involving conversion reactions among hydrocarbons.

Catalysts prepared by the present improved process have been found to exhibit superior activity in such processes as the reforming of low antiknock value gasolines and naphthas to increase antiknock characteristics.

In accordance with the broad concepts of the present invention a precipitated and purified hydrated aluminum oxide is composited with a relatively small amount of an agent which is effective in dispersing or peptizing the hydrated aluminum oxide. The mixture of alumina and peptizing agent is added to water to form a sol of alumina, and compounds are added to the sol which are soluble in the aqueous medium and which are capable of yielding a catalytically active substance. Subsequently the liquid is evaporated and the catalyst developed by controllably heating the residual solid materials.

In one specific embodiment the present invention comprises a process for the manufacture of catalyst composites consisting essentially of aluminum oxide and other catalytically active oxides by adding to a purified hydrated aluminum oxide a minor proportion of an ammonium salt, thoroughly mixing the alumina and the ammonium salt, forming an alumina hydrosol by adding the mixture to an aqueous medium, adding a compound capable of yielding a catalytically active substance, thereafter evaporating the solution to substantial dryness and further heating the residual material thus obtained to develop the catalytic composite.

The improvement, which characterizes the present invention and differentiates it from previously known processes in the manufacture of catalysts is in the use of minor proportions of ammonium salts with hydrated aluminum oxides whereby hydrosols are readily formed in which the alumina exists in a very fine state of subdivision so that when substances are added which are capable of yielding other catalytically active oxides, there is an intimate contacting of the alumina and the added substances prior to and during the evaporation of the aqueous medium and the production of the catalyst composite in the final heating step. Ammonium chloride has been found to be particularly suitable for addition to hydrated alumina to assist the hydrosol formation and amounts of this salt, varying from about 1 to about 10 percent by weight of the anhydrous alumina, will serve to assist the dispersion of the alumina to form the hydrosol. In a large number of instances satisfactory dispersion may be obtained with amounts of ammonium chloride of the order of from about 2 to about 3 percent by weight of the alumina. Other ammonium salts, such as ammonium sulfate, ammonium nitrate, and the other halide salts of ammonium may be used alternatively in different proportions.

The function of the ammonium compounds in promoting the dispersion of hydrated aluminas in aqueous media is evidently to peptize the alumina. This effect has not been previously noted in connection with volatile ammonium compounds, particularly when they are used in the small amounts which we have found to be sufficient for promoting the dispersion of the alumina. The desired dispersion may be further assisted by adding the mixture of alumina and the ammonium salt to a mildly acid aqueous medium. Thus acids, or other solutions having a pH value as low as 2, may be used as the continuous phase in the formation of the desired alumina hydrosol. The compound or compounds which serve as the source of the other catalytically active substance may be added to the sol after it has been formed or, in some instances, the compound may be present in the aqueous medium in which the hydrosol is developed.

The process of the invention is particularly applicable to the production of catalysts in which alumina is a major constituent and oxides such as molybdic oxide are relatively minor constituents. Such catalysts are particularly useful in various hydrocarbon conversion reactions including hydrocarbon hydrogenation reactions in which hydrogen is simply added to saturate unsaturated hydrocarbons; in the so-called destructive hydrogenation processes in which decomposition and recomposition reactions occur in the presence of hydrogen in the dehydrogenation of organic compounds such as hydrocarbons; in the reforming of gasolines to improve antiknock properties, etc. Alumina-molybdena catalysts are particularly useful in the so-called "hydroforming" process in which gasolines inferior in antiknock value are heated in contact with catalysts in the presence of hydrogen to increase their antiknock properties by reactions which may involve cracking, cyclization and isomerization, the hydrogen influencing the reactions in the direction of increased antiknock value without material consumption thereof and in general lowering carbon deposits on the catalysts.

Other catalysts which may be made by the process of the present invention include those comprising alumina and the oxides of chromium and/or tungsten, which metals are listed in the left-hand column in group VI of the periodic table along with molybdenum; or catalysts comprising alumina plus metals or oxides of metals of the iron group including iron, nickel and cobalt. Other catalysts which may be made in accordance with the process of the present invention include those consisting of alumina and the oxides of the elements in the left-hand column of group IV comprising cerium, thorium, zirconium and titanium; and the left-hand column of group V comprising vanadium, columbium and tantalum. These various catalysts may be used in different hydrocarbon conversions such as cracking, hydrogenation, reforming, dehydrogenation, dehydrocyclization, and isomerization of paraffin and naphthene hydrocarbons.

As a basis for the present invention we have found that certain definite types of hydrated aluminas may be dispersed in aqueous media to form hydrosols when mixed with minor amounts of ammonium salts. The dispersion may be effected most readily in the case of hydrated aluminas which have been precipitated from solution and purified by washing to remove a substantial proportion of the soluble compound present. One class of hydrated aluminas which can be satisfactorily utilized includes aluminas which have been precipitated by adding volatile basic precipitants such as ammonium hydroxide, amonium carbonate, etc., to aqueous solutions of aluminum salts such as aluminum chloride, aluminum bromide, aluminum iodide, aluminum sulfate and aluminum nitrate. These precipitated aluminas as originally obtained are usually gamma alumina mono-hydrates which change over into gamma alumina tri-hydrates on prolonged standing in an alkaline medium. Such precipitated aluminas may be washed with water or weakly acidic solvents to substantially completely remove any excess of precipitant and of ammonium salts formed by the interaction of the alkaline precipitant and the aluminum salt. It is essential to the success of the present types of operations that the soluble materials be washed out so that the amount of added ammonium salt can be regulated to permit the best dispersion of the alumina.

Other types of hydrated aluminas which may be utilized as starting material in the present process are those which have been formed by treating solutions of alkaline metal aluminates with carbon dioxide. Such precipitated aluminas are commonly washed to remove alkaline metal carbonates and bicarbonates and then partially dehydrated to form the so called "activated" aluminas of commerce which are used as absorbent materials for the purification of various liquid media and as bases for catalytic composites made by impregnating the granular solids with decomposable substances capable of yielding catalytic oxides.

We have found that aluminas varying considerably in their combined and total water contents can be dispersed in aqueous media by using varying amounts of volatile ammonium salts in admixture with them. The choice of ammonium salt and the optimum amount for insuring satisfactory sol formation will vary with the method of manufacture and the degree and type of hydration of the alumina. The best proportions of alumina and peptizing agents can be determined by small scale laboratory tests prior to the use of the process on a commercial scale.

In accordance with the present process a compound which is capable of yielding a catalytically active material may be added to the aqueous medium prior to the formation of the alumina sol or after the sol has been formed. After thorough mixing to insure intimate contacting of the alumina particles and the solution of the dissolved compound, the total mixture is heated to evaporate the water. After the water has been vaporized the residual solid material is dried at some temperature within the range of from about 250 to 500° F. After the volatile content of the residue from this step is reduced to about 10 percent, the residue may be further heated to develop catalytic properties. During this final heating, hydrates of alumina break down to form lower hydrates and eventually all of the water of hydration may be removed and substantially anhydrous gamma alumina produced. If the heating is continued at too high a temperature, there will be some formation of the alpha modification of alumina, and the catalytic properties of the composite will diminish generally in proportion to the amount of alpha alumina formed.

As previously indicated, the catalyst composite comprises one or more substances in addition to alumina. The choice of the non-aluminiferous substances added will depend to a large extent upon the process in which the catalyst is to be employed. Catalysts produced by our method are not necessarily equivalent in all processes nor are those which are useful in the same process necessarily exactly equivalent to each other. However, for whatever purpose they may be useful the catalysts prepared by our method are superior to those prepared by the conventional forms of manufacture involving the impregnation of alumina.

The compounds of the added substance which may be used in manufacturing catalysts by our method may vary somewhat depending upon their properties and also upon the particular substance which is to be added to the hydrated alumina. In the case of molybdena-containing catalysts and catalysts containing certain other components which are useful for hydroforming gasolines and naphthas, the metal should be in the acid radical. For example, ammonium-molybdate should be used in the manufacture of alumina-molybdena catalysts according to our improved process.

The compounds which are to be added to the wet hydrogel should be soluble in substantial quantities, preferably in water, and should be of a type which is readily decomposable in the final calcining treatment to which the composite is subjected. The compounds should preferably be of such a nature that the decomposition product thereof consists of the oxide of the metal containing no undesirable residues as a constituent of the catalyst. The products of decomposition other than the metal oxide should be readily volatilizable under the conditions of subsequent heating. Thus, for example, the composite of the wet alumina hydrogel with ammonium-molybdate solution after evaporation and subsequent heating would yield a composite containing oxides of aluminum and molybdenum, but without any undesirable residue, which is a catalyst poison, from the compound which was the source of the molybdena.

The one possible exception to this might be in cases in which a stabilizing compound is desired as a component of the catalyst; thus certain composites may desirably contain magnesium oxide in relatively minor amounts; usually less than about 5 per cent. The compound added to the wet alumina gel may comprise such materials as, for example, magnesium chromate when the catalyst is to contain chromia, magnesia and alumina. Alkali metal molybdates, chromates, etc., are to be avoided where alkali metal compounds exert a poisonous effect on the final composite, as they do in composites of this kind useful for dehydrogenation, reforming, etc.

Thus the added compound which is to be the source of the catalytic component may comprise a compound in which the metal is in the acid radical, the remaining part of the compound comprising a component which is either a desirable constituent of the catalyst because of the stabilizing effect, or the catalytic effect which it lends to the composite; or else it should be volatilizable at the decomposition temperature of said added compound.

The amount of non-aluminiferous component of the catalyst in relation to the alumina in the final composite may vary over a considerable range, the alumina being the major constituent. In the case of alumina-molybdena composites, catalysts of maximum activity, as shown by the increase in octane number obtained when gasolines or naphthas are hydroformed, will usually contain molybdena in amounts of the order of from about 6 to about 12 percent, although larger or smaller quantities may be used. In the case of other added catalytically active components, the percentage of the compound associated with the alumina may vary over a considerably wider range. For example, effective dehydrogenation and dehydrocyclization catalysts containing chromia, include those in which the amount of chromium sesquioxide in the alumina-chromia composites varies from as low as 2 to as high as 30 percent.

The catalysts made by the present process have numerous advantages when compared with catalysts of the same chemical composition made by conventional processes such as by impregnating dried alumina particles with solutions of compounds capable of yielding catalytic oxides or by co-precipitation methods wherein the catalytic compounds are precipitated in the form of hydrated oxides along with the primary precipitate of hydrated alumina. Apparently, the alumina and the added catalytically active compounds are thoroughly dispersed in each other in the catalysts made by our process, which may account for the higher initial activities, higher stability in respect to loss of structure and catalytic properties on accidental overheating or continued use at high temperatures, better life after repeated use and reactivation, and lower carbon deposits for a given conversion and easier regeneration.

The composites prepared by the present procedure are utilizable in various types of processes including those of a batch and of a continuous character and they may be used in the form of a powder or as granules, pellets or extrudates. In one type of continuous operation prepared particles are placed in reaction chambers through which various hydrocarbon reactants may be passed at controlled temperatures, pressures and rates of flow. In powdered form the catalysts may be used in finely divided condition so that the so-called "fluid" type operation may be employed wherein the vapors of hydrocarbon reactants are caused to carry relatively large weight proportions of the powdered catalyst through a reaction zone, after which the catalyst is separated by settling or centrifuging and recycled to further use as long as its catalytic activity is sufficient or wherein the vapors of hydrocarbon reactants pass through a mass of powdered catalytic material and cause its circulation in the reactor without substantial carry-over of the catalyst.

We claim as our invention:

1. A process for producing catalysts which comprises mixing a precipitated and purified hydrated alumina with from about 1% to about 10% by weight of an ammonium salt, dispersing the resultant mixture in an aqueous medium to form an alumina hydrosol, adding to said hydrosol a metal compound soluble in said aqueous medium and capable of yielding a catalytically active metal oxide upon heating, evaporating the resultant mixture to substantial dryness, and heating the resultant residual material to convert said compound to the metal oxide.

2. The process as defined in claim 1 further characterized in that said salt is ammonium chloride.

3. The process as defined in claim 1 further characterized in that said aqueous medium is acidulated water.

4. The process as defined in claim 1 further characterized in that the metal of said compound is an element from the left-hand column of group VI of the periodic table.

5. The process as defined in claim 1 further characterized in that the metal of said compound is molybdenum.

6. The process as defined in claim 1 further characterized in that the metal of said compound is chromium.

7. The process as defined in claim 1 further characterized in that said compound is ammonium molybdate.

8. A process for producing catalysts which comprises mixing a precipitated and purified hydrated alumina with from about 1% to about 10% by weight of ammonium chloride, dispersing the resultant mixture in an aqueous medium to form an alumina hydrosol, adding ammonium molybdate to said hydrosol, evaporating the mixture of ammonium molybdate and alumina hydrosol to substantial dryness, and heating the resultant residual material to convert the ammonium molybdate to molybdenum oxide.

GLENN M. WEBB.
MARVIN A. SMITH.